3,058,988
CARBOHYDRAZIDES

Anne M. Von Esch, Joliet, and William R. Sherman, Lake Forest, Ill., assignors to Abbott Laboratories, Chicago, Ill., a corporation of Illinois
No Drawing. Filed Aug. 19, 1960, Ser. No. 50,560
11 Claims. (Cl. 260—295)

This invention relates to the carbohydrazides corresponding to the formulae

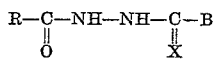

and

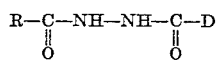

and a method for their preparation. In this and succeeding formulae, R represents furyl, 5-nitrofuryl or pyridyl, B represents phenylhydrazino, 4-nitrophenylhydrazino or benzoylhydrazino, D represents furoylhydrazino, 5-nitro-2-furoylhydrazino or isonicotinylhydrazino and X represents oxygen or sulfur. These compounds are crystalline solids soluble in common organic solvents but insoluble in water. They are useful as coccidiostats and anthelmintic agents. In such use, they can be employed in the feed of poultry to control the growth of $Eimeria\ tenella$ which is the causative agent of cecal coccidiosis. The new compounds are likewise effective against pinworms such as $Syphacia\ obvelata$. In actual tests, 1-(5-nitro-2-furoyl)-5-(4-nitrophenyl)-carbohydrazide when employed at a concentration of 0.1% of the diet of chickens gave complete control of coccidiosis.

The new compounds represented by the formula

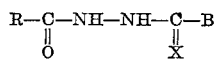

can be prepared by refluxing equimolar proportions of phenylhydrazine, 4-nitrophenylhydrazine or benzoylhydrazine and a compound of the formula

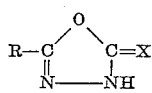

in the presence of an inert organic solvent such as ethanol or dioxane. Upon completion of the reaction, the reaction mixture is cooled or concentrated to precipitate the desired product which is separated by filtration and purified by crystallization from a suitable solvent.

The compounds represented by the formula

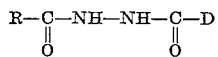

can be prepared by refluxing a mixture of water and a compound of the formula

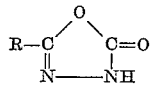

Upon cooling the reaction mixture, the desired product precipitates and is thereafter separated by filtration and purified by crystallization from water or other suitable solvents.

The following examples set forth in detail some of the specific embodiments of the invention but are not to be construed as limiting.

EXAMPLE 1

1-(5-Nitro-2-Furoyl)-5-Benzoylcarbohydrazide

A mixture of 5.9 grams (0.03 mole) of 5-(5-nitro-2-furyl)-1,3,4-oxadiazol-2-one melting at 202° C. and 4.1 grams (0.03 mole) of benzoylhydrazine in 80 ml. of ethanol was heated at the reflux temperature for one hour. The reaction mixture was then cooled to precipitate the desired product which after crystallization from a dimethylformamide-water mixture melted at 231°–232° C. with decomposition. Upon analysis, the product was found to contain 46.95% carbon, 3.28% hydrogen and 21.21% nitrogen compared to the calculated values of 46.85%, 3.33% and 21.02%, respectively.

EXAMPLE 2

1-(5-Nitro-2-Furoyl)-5-Phenyl-Carbohydrazide

A mixture of 5-(5-nitro-2-furyl)-1,3,4-oxadiazol-2-one (5.9 grams, 0.03 mole) and 3.3 grams (0.03 mole) of phenylhydrazine in 80 ml. of ethanol was heated at the reflux temperature for 24 hours. The hot reaction mixture was treated with charcoal, filtered, concentrated and cooled to precipitate the desired product which after crystallization from ethanol melted at 201°–202° C. with decomposition and was found to contain 47.19% carbon and 23.00% nitrogen compared to the calculated values of 47.21% and 22.95%, respectively.

EXAMPLE 3

1-(5-Nitro-2-Furoyl)-5-(4-Nitrophenyl)-Carbohydrazide

This compound was prepared by refluxing a mixture of 5.9 grams (0.03 mole) of 5-(5-nitro-2-furyl)-1,3,4-oxadiazol-2-one and 4.6 grams (0.03 mole) of 4-nitrophenyl hydrazine in 80 ml. of ethanol. Upon cooling the reaction mixture, the desired product precipitated and was separated by filtration. After crystallization from a dimethylformamide-water mixture, it melted at 252°–254° C. with decomposition and contained 41.16% carbon and 23.92% nitrogen compared to the calculated values of 41.15% and 24.00%, respectively.

EXAMPLE 4

1-(5-Nitro-2-Furoyl)-5-Phenylthiocarbohydrazide

This compound was prepared by refluxing equimolecular proportions of 5-(5-nitro-2-furyl)-1,3,4-oxadiazol-2-thione melting at 156° C. and phenylhydrazine in ethanol for 24 hours. The solvent was then removed from the reaction mixture and the residue crystallized first from chloroform and then from ethanol to obtain the desired product as a yellow crystalline solid melting at 192°–193° C. with decomposition. Upon analysis, the product was found to contain 44.79% carbon and 21.56% nitrogen compared to the calculated values of 44.88% and 21.79%, respectively.

EXAMPLE 5

*1-(5-Nitro-2-Furoyl)-5-(4-Nitrophenyl)-Thiocarbohydrazide*

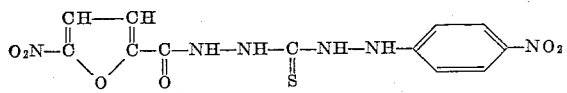

0.02 mole each of 5-(5-nitro-2-furyl)-1,3,4-oxadiazol-2-thione and 4-nitrophenylhydrazine were heated under reflux in 100 ml. of ethanol for 24 hours. The reaction mixture was thereafter treated with charcoal, filtered and evaporated to dryness. The residue was extracted with chloroform from which the desired product crystallized upon cooling. After recrystallization from a methanol-water mixture, the product melted at 203°–205° C. with decomposition and contained 39.05% carbon and 22.76% nitrogen compared to the calculated values of 39.32% carbon and 22.96% nitrogen.

EXAMPLE 6

*1,5-Bis-(5-Nitro-2-Furoyl)-Carbohydrazide*

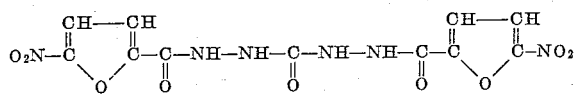

Five grams (0.025 mole) of 5-(5-nitro-2-furyl)-1,3,4-oxadiazol-2-one and 100 ml. of water were heated under reflux for 2 hours. The reaction mixture was then cooled and the desired product which precipitated was separated by filtration and crystallized from a dimethylformamide-water mixture. M.P.=234°–235° C. Upon analysis, the product was found to contain 35.70% carbon and 22.67% nitrogen compared to the calculated values of 35.88% and 22.83%, respectively.

EXAMPLE 7

*1,5-Bis-(2-Furoyl)-Carbohydrazide*

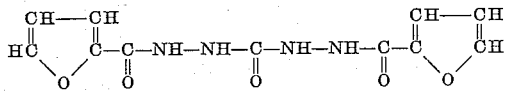

Four grams (0.026 mole) of 5-(2-furoyl)-1,3,4-oxadiazol-2-one melting at 112°–114° C. and 100 ml. of water were heated under reflux for 2 hours. Upon cooling the reaction mixture, the desired product precipitated and after recrystallization from water melted at 224°–225° C. The identity of the product was confirmed by elemental analysis.

EXAMPLE 8

*1,5-Diisonicotinylcarbohydrazide*

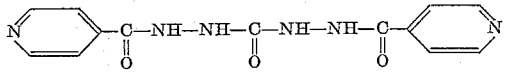

One gram (0.006 mole) of 5-(4-pyridyl)-1,3,4-oxadiazol-2-one melting at 270°–272° C. and 25 ml. of water were heated at 150° C. in a steel pressure vessel for 10 hours. Upon cooling, the desired product was obtained as a crystalline solid which after recrystallization from a dimethylformamide-water mixture melted at 267°–268° C. and contained 51.82% carbon and 27.91% nitrogen compared to the calculated values of 52.00% carbon and 27.99% nitrogen.

In a manner similar to that already described, other compounds contemplated to be within the scope of this invention can be readily prepared. Thus, when 5-(2-furyl)-1,3,4-oxadiazol-2-one is reacted with benzoylhydrazine, phenylhydrazine or 4-nitrophenylhydrazine one obtains 1-(2-furoyl)-5-benzoylcarbohydrazide, 1-(2-furoyl)-5-phenylcarbohydrazide and 1-(2-furoyl)-5-(4-nitrophenyl)-carbohydrazide, respectively. By reacting 5-(4-pyridyl)-1,3,4-oxadiazol-2-one with benzoylhydrazine, phenylhydrazine or 4-nitrophenyl hydrazine, there is obtained 1-(4-pyridyl)-5-benzoylcarbohydrazide, 1-(4-pyridyl)-5-phenylcarbohydrazide and 1-(4-pyridyl)-5-(4-nitrophenyl)-carbohydrazide, respectively.

In like manner, the reaction of 5-(2-furyl)-1,3,4-oxadiazol-2-thione with benzoylhydrazine, phenylhydrazine or 4-nitrophenylhydrazine will produce 1-(2-furoyl)-5-benzoylthiocarbohydrazide, 1-(2-furoyl)-5-phenylthiocarbohydrazide and 1-(2-furoyl)-5-(4-nitrophenyl)-thiocarbohydrazide, respectively. Similarly, the reaction of 5-(4-pyridyl)-1,3,4-oxadiazol-2-thione with benzoylhydrazine, phenylhydrazine or 4-nitrophenylhydrazine results in the production of 1-(4-pyridyl)-5-benzoylthiocarbohydrazide, 1-(4-pyridyl)-phenylthiocarbohydrazide and 1-(4-pyridyl)-5-(4-nitrophenyl)-thiocarbohydrazide, respectively. The reaction of 5-(5-nitro-2-furyl)-1,3,4-oxadiazol-2-thione with benzoylhydrazine will produce 1-(5-nitro-2-furoyl)-5-benzoylthiocarbohydrazide.

What is claimed is:

1. A compound selected from the group consisting of compounds of the formula

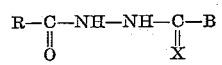

and compounds of the formula

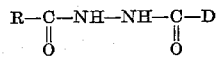

wherein R is selected from the group consisting of furyl, 5-nitrofuryl and pyridyl, B is selected from the group consisting of phenylhydrazino, 4-nitrophenylhydrazino and benzoylhydrazino, D is selected from the group consisting of furoylhydrazino, 5-nitro-2-furoylhydrazino and isonicotinylhydrazino and X is selected from the group consisting of oxygen and sulfur.

2. 1-(5-nitro-2-furoyl)-5-benzoylcarbohydrazide.
3. 1-(5-nitro-2-furoyl)-5-phenylcarbohydrazide.
4. 1-(5-nitro-2-furoyl)-5-(4-nitrophenyl)-carbohydrazide.
5. 1-(5-nitro-2-furoyl)-5-phenylthiocarbohydrazide.
6. 1-(5-nitro-2-furoyl)-5-(4-nitrophenyl)-thiocarbohydrazide.
7. 1,5-bis-(5-nitro-2-furoyl)-carbohydrazide.
8. 1,5-bis-(2-furoyl)-carbohydrazide.
9. 1,5-diisonicotinylcarbohydrazide.
10. A method for the preparation of compounds of the formula

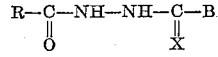

wherein R is selected from the group consisting of furyl, 5-nitrofuryl and pyridyl, B is selected from the group consisting of phenylhydrazino, 4-nitrophenyl hydrazino and benzoylhydrazino and X is selected from the group consisting of oxygen and sulfur which comprises refluxing equimolecular proportions of a compound of the formula

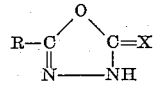

wherein R and X are as previously defined and a member of the group consisting of phenylhydrazine, 4-nitrophenylhydrazine and benzoylhydrazine.

11. A method for the preparation of compounds of the formula

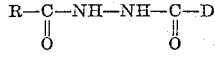

wherein R is selected from the group consisting of furyl, 5-nitrofuryl and pyridyl, B is selected from the group consisting of furoylhydrazino, 5-nitro-2-furoylhydrazino and isonicotinylhydrazino which comprises refluxing a mixture of water and a compound of the formula
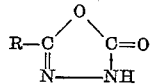
wherein R is as previously defined.
References Cited in the file of this patent
Stratton et al.: J. Chem. Soc., pages 1154–9, 1931.
Stempel et al.: J. Org. Chem., vol. 20, pages 412–18 (1955).